United States Patent
Sheridan

(10) Patent No.: US 10,280,843 B2
(45) Date of Patent: May 7, 2019

(54) GEARED TURBOFAN WITH INTEGRAL FRONT SUPPORT AND CARRIER

(71) Applicant: United Technologies Corporation, Hartford, CT (US)

(72) Inventor: William G. Sheridan, Southington, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 834 days.

(21) Appl. No.: 14/633,244

(22) Filed: Feb. 27, 2015

(65) Prior Publication Data

US 2016/0010562 A1    Jan. 14, 2016

Related U.S. Application Data

(60) Provisional application No. 61/949,331, filed on Mar. 7, 2014.

(51) Int. Cl.

| | | |
|---|---|---|
| F02C 7/36 | (2006.01) | |
| F01D 25/16 | (2006.01) | |
| F02C 3/107 | (2006.01) | |
| F02C 7/06 | (2006.01) | |
| F01D 5/02 | (2006.01) | |
| F01D 15/12 | (2006.01) | |
| F02C 3/04 | (2006.01) | |

(52) U.S. Cl.
CPC .................. *F02C 7/36* (2013.01); *F01D 5/02* (2013.01); *F01D 15/12* (2013.01); *F01D 25/16* (2013.01); *F01D 25/162* (2013.01); *F02C 3/04* (2013.01); *F02C 3/107* (2013.01); *F02C 7/06* (2013.01); *F05D 2220/32* (2013.01); *F05D 2230/60* (2013.01); *F05D 2260/40311* (2013.01)

(58) Field of Classification Search
CPC .... F02C 7/36; F02C 7/06; F02C 3/107; F02C 3/04; F01D 15/12; F01D 25/16; F01D 25/162; F05D 2260/40311
See application file for complete search history.

(56) References Cited

U.S. PATENT DOCUMENTS

| | | |
|---|---|---|
| 2,154,532 A | 4/1939 | Ryder |
| 3,303,713 A | 2/1967 | Hicks |
| (Continued) | | |

FOREIGN PATENT DOCUMENTS

EP    2360391    2/2011

OTHER PUBLICATIONS

U.S. Appl. No. 14/307,587, filed Jun. 18, 2014 Titled Load Balanced Journal Bearing Pin.

(Continued)

*Primary Examiner* — Steven Sutherland
(74) *Attorney, Agent, or Firm* — Carlson, Gaskey & Olds, P.C.

(57) ABSTRACT

A gas turbine engine includes a fan section including a fan hub. A speed reduction device includes a star gear system. A turbine section is connected to the fan section through the speed reduction device. A first fan bearing for supporting rotation of the fan hub is connected forward of the speed reduction device. A second fan bearing for supporting rotation of the fan hub is connected aft of the speed reduction device. A first outer race of the first fan bearing is attached to the fan hub.

20 Claims, 3 Drawing Sheets

(56) References Cited

U.S. PATENT DOCUMENTS

| | | | |
|---|---|---|---|
| 5,102,379 A | 4/1992 | Pagluica et al. | |
| 5,389,048 A | 2/1995 | Carlson | |
| 5,466,198 A | 11/1995 | McKibbin et al. | |
| 5,685,797 A | 11/1997 | Barnsby et al. | |
| 6,223,616 B1 | 5/2001 | Sheridan | |
| 6,467,252 B1* | 10/2002 | Payling | F01K 21/047 |
| | | | 60/39.53 |
| 6,732,502 B2* | 5/2004 | Seda | F01D 5/03 |
| | | | 60/226.1 |
| 6,964,155 B2 | 11/2005 | McCune et al. | |
| 7,056,259 B2 | 6/2006 | Fox | |
| 7,297,086 B2 | 11/2007 | Fox | |
| 7,694,505 B2 | 4/2010 | Schilling | |
| 7,882,693 B2 | 2/2011 | Schilling | |
| 8,075,443 B2 | 12/2011 | Cunliffe et al. | |
| 8,192,323 B2 | 6/2012 | Fox | |
| 8,261,527 B1 | 9/2012 | Stearns et al. | |
| 8,430,788 B2 | 4/2013 | Fox et al. | |
| 2007/0084185 A1 | 4/2007 | Moniz | |
| 2007/0087892 A1* | 4/2007 | Orlando | F02C 3/067 |
| | | | 475/348 |
| 2008/0006018 A1* | 1/2008 | Sheridan | F01D 25/18 |
| | | | 60/39.1 |
| 2008/0120839 A1* | 5/2008 | Schilling | F02C 3/107 |
| | | | 29/888.02 |
| 2011/0206498 A1 | 8/2011 | McCooey | |
| 2012/0102971 A1* | 5/2012 | McCune | F01D 5/027 |
| | | | 60/805 |
| 2012/0192570 A1* | 8/2012 | McCune | F01D 25/18 |
| | | | 60/792 |
| 2012/0272762 A1 | 11/2012 | Sheridan | |
| 2012/0275904 A1* | 11/2012 | McCune | F01D 5/027 |
| | | | 415/122.1 |
| 2012/0277055 A1 | 11/2012 | Sheridan | |
| 2013/0023378 A1* | 1/2013 | McCune | F16H 57/082 |
| | | | 475/344 |
| 2013/0053202 A1 | 2/2013 | Ghanime et al. | |
| 2013/0186058 A1 | 7/2013 | Sheridan et al. | |

OTHER PUBLICATIONS

Jane's Aero-Engines, Edited by Bill Gunstron, Issue Seven, five pages.

Performance and Weight Estimates for an Advanced Open Rotor Engine, Eric S. Hendricks and Michael T. Tong, NASA/TM-2012-217710, AIAA-2012-3911, Sep. 2012.

Ciepluch et al., "Quiet, Powered-Lift Propulsion," NASA Conference Publication 2077, Nov. 14-15, 1978 (429 pages)—Broken down to Report 1 through Report 8.

Extended European Search Report for European Application No. 15158231.9 dated Jul. 28, 2015.

European Examination Report for European Application No. 15158231.9 dated Dec. 15, 2016.

* cited by examiner

GEARED TURBOFAN WITH INTEGRAL FRONT SUPPORT AND CARRIER

CROSS-REFERENCE TO RELATED APPLICATIONS

This application claims priority to U.S. Provisional Application No. 61/949,331, which was filed on Mar. 7, 2014 and is incorporated herein by reference.

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one of the turbine sections provides an input to the epicyclical gear assembly that drives the fan section at a reduced speed such that both the turbine section and the fan section can rotate at closer to optimal speeds.

The epicyclical gear assembly includes bearings that support rotation of gears. Loads incurred during operation can disrupt a desired relative alignment between gears and therefore the gear assembly may be supported on structures designed to accommodate such loads.

Although geared architectures improve propulsive efficiency, they present different challenges that can reduce any efficiency gains. Accordingly, turbine engine manufacturers continue to seek further improvements to engine performance including improvements to thermal, transfer and propulsive efficiencies.

SUMMARY

In one exemplary embodiment, a gas turbine engine includes a fan section including a fan hub. A speed reduction device includes a star gear system. A turbine section is connected to the fan section through the speed reduction device. A first fan bearing for supporting rotation of the fan hub is connected forward of the speed reduction device. A second fan bearing for supporting rotation of the fan hub is connected aft of the speed reduction device. A first outer race of the first fan bearing is attached to the fan hub.

In a further embodiment of the above, a compressor section is configured to rotate with the fan section.

In a further embodiment of any of the above, a first inner race of the first fan bearing is connected to a static structure and a second inner race of the second fan bearing is connected to a static structure.

In a further embodiment of any of the above, the first bearing and the second bearing include at least one of roller bearings, ball bearings, or tapered bearings.

In a further embodiment of any of the above, the gas turbine engine includes a high pressure compressor with a compression ratio of at least 20:1.

In a further embodiment of any of the above, the gas turbine engine includes a low pressure compressor with a compression ratio of at least 2:1.

In a further embodiment of any of the above, the gas turbine engine includes a fan by pass ratio greater than 10.

In a further embodiment of any of the above, the star gear system includes a sun gear, star gears, a ring gear mechanically attached to the fan section, and a carrier fixed from rotation.

In a further embodiment of any of the above, each of the star gears include a star gear bearing.

In a further embodiment of any of the above, the carrier includes multiple flexible posts for mounting each of the star gears and the star gear bearing.

In a further embodiment of any of the above, the inner race of the first bearing is attached to a carrier that is fixed to an engine static structure.

In a further embodiment of any of the above, the speed reduction device is located radially in from a first compressor and the speed reduction device is axially aligned with the first compressor.

In a further embodiment of any of the above, a carrier is attached to an engine static structure without a static flexible mount.

In another exemplary embodiment, a fan drive gear module includes a sun gear. A multitude of star gears surround the sun gear. A carrier supports the multitude of star gears. The carrier is configured to support a fan hub with a first fan bearing located on a first side of the carrier and a second fan bearing located on a second opposite side of the carrier. The carrier is configured to be attached to a static engine structure without a static flexible mount. An outer race of at least one of the first fan bearing and the second fan bearing is configured to connect to the fan hub.

In a further embodiment of the above, each of the multitude of star gears include a star gear bearing.

In a further embodiment of any of the above, the carrier includes multiple flexible posts for mounting each of the multitude of star gears and the star gear bearing.

In a further embodiment of any of the above, a ring gear is configured to be attached to the fan hub.

In another exemplary embodiment, a method of designing a gas turbine engine includes coupling a speed reduction device between a fan hub and a low pressure turbine drive shaft and positioning a first fan bearing forward of the speed reduction device. A first outer race of the first fan bearing is attached to a fan hub. A second fan bearing is positioned aft of the speed reduction device.

In a further embodiment of any of the above, the method includes positioning of a first inner race of the first fan bearing and a second inner race of the second fan bearing is attached to a static structure.

In a further embodiment of any of the above, the method includes connecting a ring gear from the speed reduction device to the fan hub.

The various features and advantages of this disclosure will become apparent to those skilled in the art from the following detailed description. The drawings that accompany the detailed description can be briefly described as follows.

DETAILED DESCRIPTION

Figure 1:
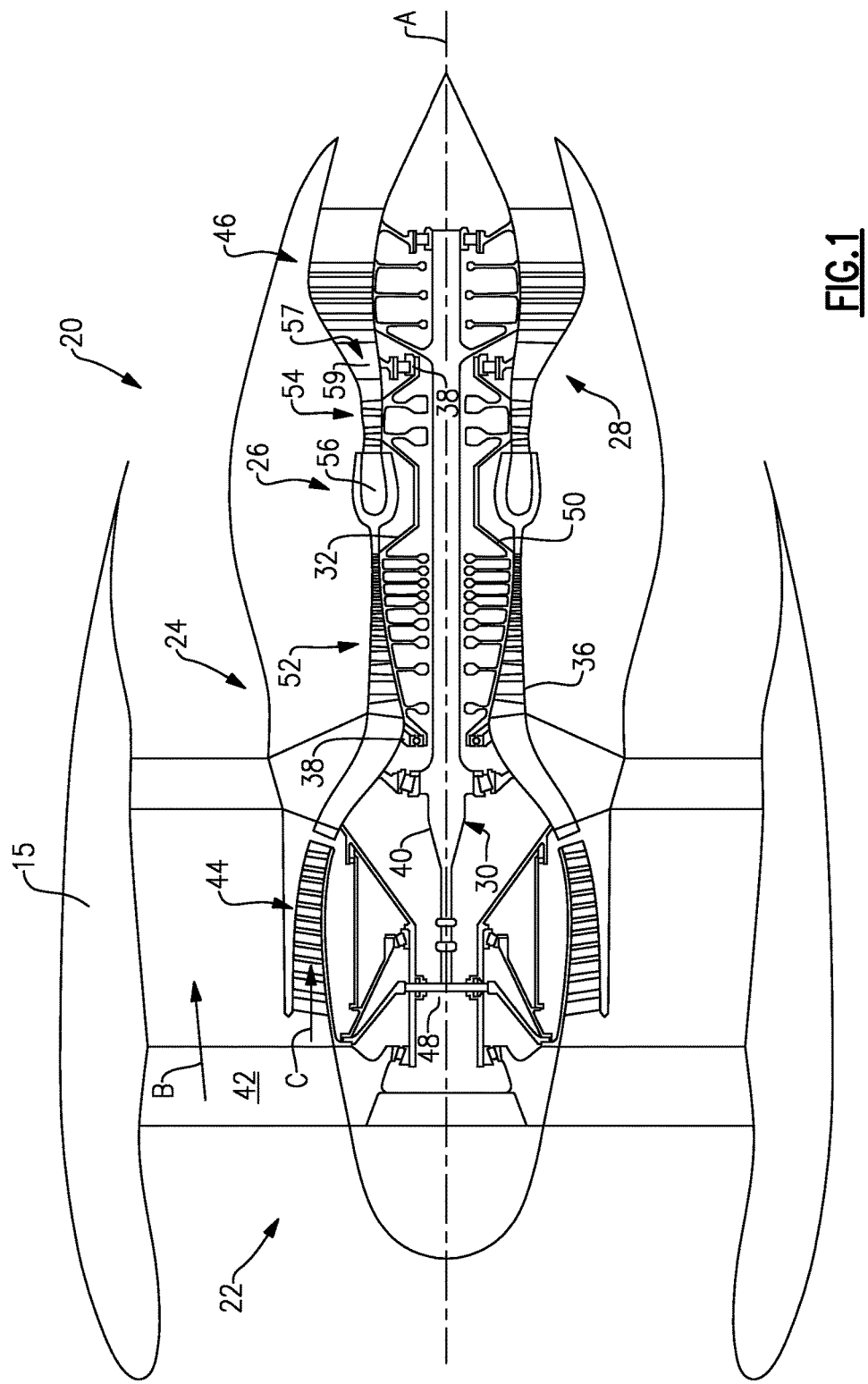
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 with a compression ratio of at least 2:1 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram° R)/(518.7° R)]^{0.5}$. The "Low corrected fan tip speed" as disclosed herein according to one non-limiting embodiment is less than about 1150 ft/second (350.5 meters/second).

Figure 2:
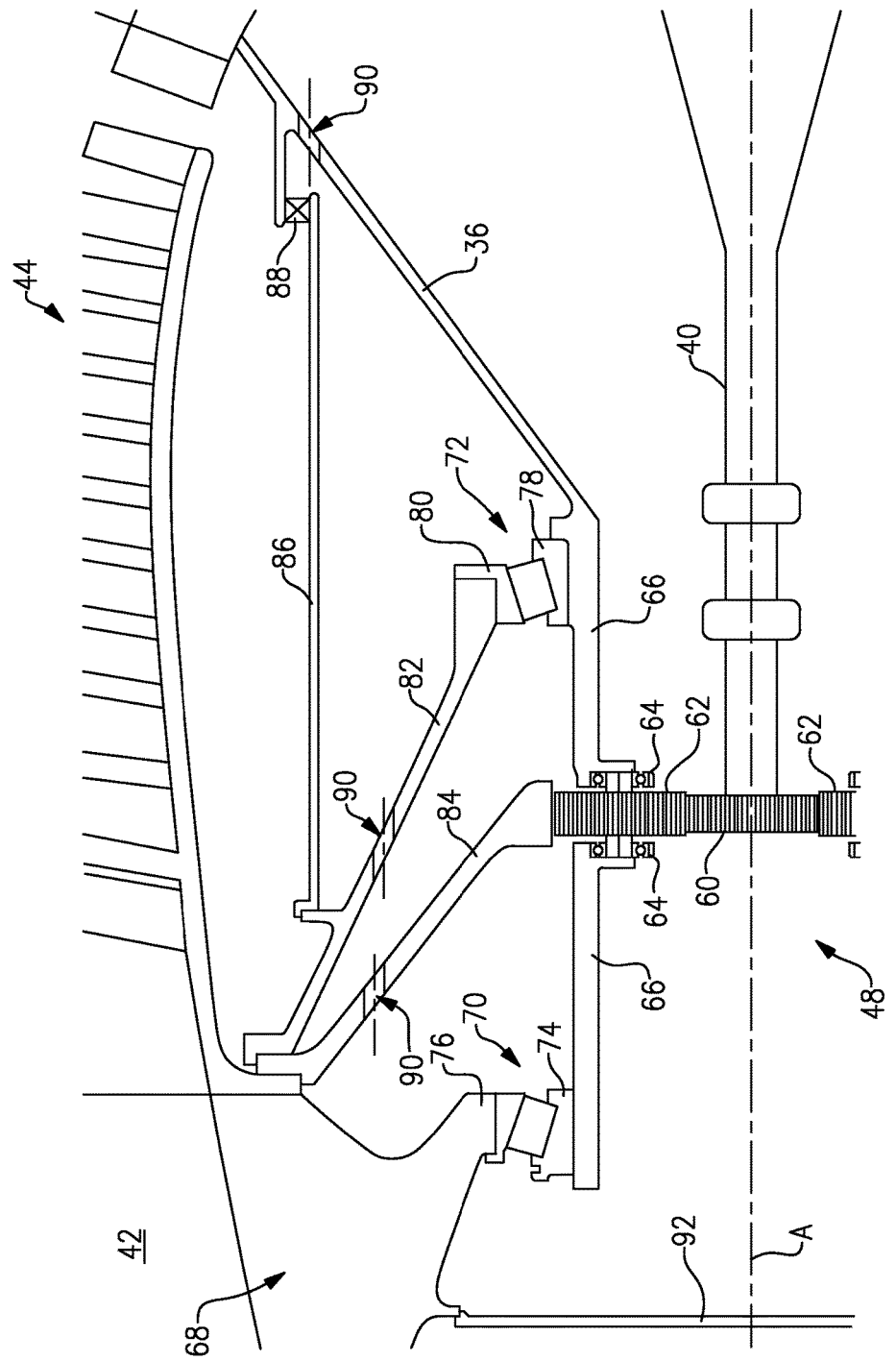
FIG. 2 is a schematic view of an example geared architecture.

FIG. 2 illustrates the inner shaft 40 driving the geared architecture 48 to turn the fan 42 and the low pressure compressor 44 together at the same rotational speed. The inner shaft 40 is connected with a sun gear 60 in the geared architecture 48. The sun gear 60 is surrounded by star gears 62 mounted on star gear bearing assemblies 64 attached to a static carrier 66. The static carrier 66 allows the star gears 62 to rotate around an axis of each star gear 62 but not around and engine axis A. The static carrier 66 is fixed relative to the engine static structure 36 on the gas turbine engine 20.

The geared architecture 48 is located radially inward and axially aligned with the low pressure compressor 44 to shorten the overall length of the gas turbine engine 20.

A fan hub 68 is supported by a forward fan bearing 70 and an aft fan bearing 72. The forward fan bearing 70 includes an inner race 74 fixed to the static carrier 66 and an outer race 76 fixed to the fan hub 68. The forward fan bearing 70 supports radial and thrust loads from a forward end of the fan hub 68.

The aft fan bearing 72 includes an inner race 78 attached to the static carrier 66, which is connected with the engine static structure 36, and an outer race 80 is attached to a rotating aft support 82. The aft fan bearing 72 supports an aft end of the fan hub 68 and carries radial loads from the fan 42.

A rotatable ring gear 84 turns the fan hub 68 and the low pressure compressor 44 at the same rotational speed. A rotating compartment wall 86 extends from the rotating aft support 82 and is sealed against the engine static structure 36 with an oil seal 88.

Scavenged oil passes through holes 90 extending through the ring gear 84, the rotating aft support 82, and the engine static structure 36 to direct oil towards the forward and aft fan bearing 70 and 72 and the geared architecture 48. A rotating cover 92 aids in retaining and directing the oil towards the forward fan bearing 70, the aft fan bearing 72, and the geared architecture 48 and to prevent the need for carbon seals.

Figure 3:
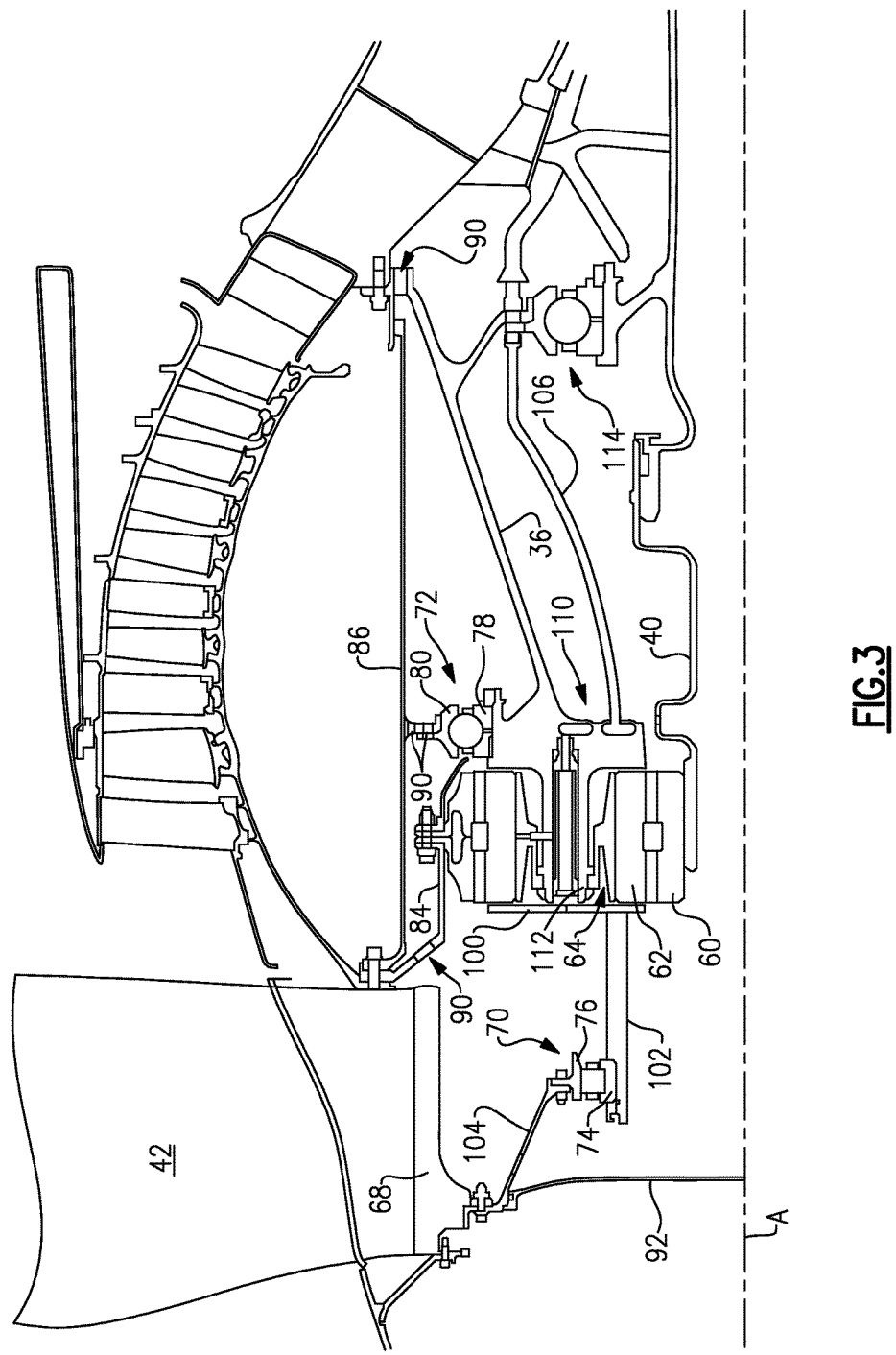
FIG. 3 is a schematic view of another example geared architecture.

FIG. 3 illustrates another example geared architecture 148. The geared architecture 148 is similar to the geared architecture 48 shown in FIG. 2 except where shown in FIG. 3 or described below.

A static carrier 110 includes an oil baffle 100 extending from a forward end and a cylindrical support 102 for supporting the forward fan bearing 70. An oil feed tube 106 supplies oil to the static carrier 110 and the rest of geared architecture 148. A multitude of flexible shafts 112 extend from the static carrier 110 to support the star gears 62 and the respective star gear bearing assemblies 64. The flexibility of the shafts 112 support torsional loads from the star gears 62 and star gear bearing assemblies 64 and allow the star gears 62 to be isolated from the engine static structure 36 such that a static flexible mount is not necessary to mount the geared architecture 148.

The forward fan bearing 70 in this example includes a roller bearing with the inner race 74 mounted to the cylindrical support 102 and the outer race 76 rotatably attached to the fan hub 68 through a hub support 104. Although a roller bearing is illustrated in this example for the forward fan bearing 70, a ball bearing or a tapered bearing could also be utilized.

The aft fan bearing 72, such as a ball bearing, is mounted on an aft side of the geared architecture 148 opposite from the forward bearing 70. Although a ball bearing is illustrated in this example for the aft fan bearing 72, a roller bearing or a tapered bearing could also be utilized.

The forward fan bearing 70 and the aft fan bearing 72 straddle the geared architecture 148 to greatly reduce misalignment imparted on the geared architecture 148. This eliminates the need for a flexible coupling on the geared architecture 148 to combat misalignment forces acting on the gears.

An inner shaft bearing 114 attached to the engine static structure 36 supports a forward end of the inner shaft 40 and carries both radial and thrust loads. Since the fan 42 imparts a forward thrust load and low pressure turbine 46 imparts an aft thrust load on the inner shaft 40, the opposing loads are generally cancelled out by the aft fan bearing 72 and the inner shaft bearing 114 both being attached to the engine static structure 36.

The gas turbine engine 20 is designed by attaching the geared architecture 48 or 148 device to the fan hub 68 and the inner shaft 40. The forward fan bearing 70 is positioned forward of the geared architecture 48 or 148 with the first outer race 76 connected to the fan hub 68. The aft fan bearing 72 is positioned aft of the geared architecture 48 or 148. The inner race 74 and the inner race 78 are attached to the static carrier (66 or 110). The ring gear 85 from the geared architecture 48 or 148 is connected to the fan hub 68.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A gas turbine engine comprising:
   a fan section including a fan hub;
   a compressor section configured to rotate with the fan section;
   a speed reduction device including a star gear system;
   a turbine section connected to the fan section through the speed reduction device;
   a first fan bearing for supporting rotation of the fan hub located axially forward of the speed reduction device;
   a second fan bearing for supporting rotation of the fan hub located axially aft of the speed reduction device; and
   a first outer race of the first fan bearing attached to the fan hub.

2. The gas turbine engine of claim 1 including a first inner race of the first fan bearing fixed from rotation relative to an engine static structure and a second inner race of the second fan bearing fixed from rotation relative to the engine static structure.

3. The gas turbine engine of claim 1 wherein the first bearing and the second bearing include at least one of roller bearings, ball bearings, or tapered bearings.

4. The gas turbine engine of claim 1, wherein the star gear system includes a sun gear, star gears, a ring gear mechanically attached to the fan section, and a carrier fixed from rotation.

5. The gas turbine engine of claim 4, wherein each of the star gears include a star gear bearing.

6. The gas turbine engine of claim 5, wherein the carrier includes multiple flexible posts for mounting each of the star gears and the star gear bearing.

7. The gas turbine engine of claim 1 wherein an inner race of a first bearing is fixed from rotation relative to a carrier and the carrier is fixed from rotation relative to an engine static structure.

8. The gas turbine engine of claim 1 wherein the speed reduction device is located radially in from a first compressor and the speed reduction device is axially aligned with the first compressor.

9. The gas turbine engine of claim 1 including a carrier fixed from rotation relative to an engine static structure without a static flexible mount.

10. The gas turbine engine of claim 1 wherein the speed reduction device is axially aligned with the compressor section.

11. The gas turbine engine of claim 1 including a rotating compartment wall configured to rotate with the compressor section and form a seal with an engine static structure.

12. The gas turbine engine of claim 1 wherein the first fan bearing is at least partially axially aligned with a fan blade of the fan section.

13. The gas turbine engine of claim 1 wherein the compressor section includes a five stage low pressure compressor.

14. The gas turbine engine of claim 1 wherein the second fan bearing includes a second outer race and the first outer race and the second outer race are fixed relative to the fan hub and rotate with the fan hub in the same direction.

15. A fan drive gear module comprising
    a sun gear;
    a multitude of star gears surrounding the sun gear rotating on star gear bearings;
    a carrier supporting the multitude of star gears and directly contacting each of the star gear bearings, the carrier is configured to support a fan hub with a first fan bearing located on a first side of the carrier and a second fan bearing located on a second opposite side of the carrier, wherein the carrier is configured to be fixed from rotation relative to an engine static structure without a static flexible mount; and a first outer race of the first fan bearing and a second outer race of the second fan bearing are fixed relative to the fan hub and rotate with the fan hub in the same direction.

16. The fan drive gear module of claim 15 wherein the carrier includes multiple flexible posts for mounting each of the multitude of star gears and the star gear bearings.

17. The fan drive gear module of claim 15 including a ring gear fixed relative to the fan hub.

18. A method of designing a gas turbine engine comprising:

coupling a speed reduction device between a fan hub and a low pressure turbine drive shaft;

positioning a first fan bearing forward of the speed reduction device, wherein a first outer race of the first fan bearing is fixed relative to a fan hub and rotates with the fan hub relative to an engine static structure; and positioning a second fan bearing aft of the speed reduction device and an outer race of the second fan bearing is fixed relative to the fan hub and rotates in the same rotational direction as the first outer race.

19. The method of claim 18 including positioning a first inner race of the first fan bearing and a second inner race of the second fan bearing are fixed from rotation relative to the engine static structure.

20. The method of claim 18 including fixing a ring gear from the speed reduction device relative to the fan hub to allow the ring gear to rotate with the fan hub.

* * * * *